United States Patent [19]

Copley

[11] 4,021,589

[45] May 3, 1977

[54] BUOYANCY MATERIALS

[75] Inventor: John R. Copley, Canton, Mass.

[73] Assignee: Emerson & Cuming, Inc., Canton, Mass.

[22] Filed: Apr. 28, 1976

[21] Appl. No.: 681,207

[52] U.S. Cl. .................. 428/68; 428/306; 428/310; 428/315; 428/323

[51] Int. Cl.² .................. B32B 3/26

[58] Field of Search .............. 428/68, 69, 71, 76, 428/306, 308, 309, 310, 315, 320, 321, 322, 323, 325, 327

[56] References Cited

UNITED STATES PATENTS

| | | | |
|---|---|---|---|
| 3,707,414 | 12/1972 | Wismer et al. .................. | 428/313 |
| 3,707,434 | 12/1972 | Stayner .................. | 428/308 |
| 3,835,208 | 9/1974 | Koutitonsky .................. | 428/315 |
| 3,849,350 | 11/1974 | Matsko .................. | 260/2.5 F |

*Primary Examiner*—William J. Van Balen
*Attorney, Agent, or Firm*—Kenway & Jenney

[57] ABSTRACT

A layered skin useful for protecting buoyancy materials of the type comprising a plurality of generally spherical buoyant bodies encased in a matrix of syntactic foam. The skin comprises an inner layer made from syntactic foam having a thickness capable of preventing implosion of buoyant bodies located in outer portions of the matrix at a desired hydrostatic pressure, and an outer layer for resisting damage to the structure and providing strength, composed of reinforcing materials such as fiberglass permeated by syntactic foam. The matrix and both layers comprise one integral structure.

17 Claims, 1 Drawing Figure

BUOYANCY MATERIALS

BACKGROUND OF THE INVENTION

This invention relates to improvements in buoyant structures of the type particularly useful in undersea environments. More particularly, it relates to a novel skin for known buoyancy materials which provides an economical and low-density means of imparting strength and impact resistance to the buoyancy materials.

U.S. Pat. No. 3,622,437 to Sidney D. Cook, the disclosure of which is incorporated herein by reference, discloses a buoyancy material which exemplifies the type of structure with which the present invention is concerned. The structure disclosed therein comprises a plurality of generally spherical, low density, buoyant bodies encased in a matrix of a light weight material known as syntactic foam, i.e., a hardenable resin loaded with hollow microspheres which serve to lower its density.

Such buoyant materials have found many uses as the sea has increasingly been utilized as a resource. For example, they are used to impart buoyancy to submergible equipment such as deep sea research instruments, cables, pipelines, and marine riser pipe such as are used in off-shore oil drilling operations. Their commercial success may be traced primarily to the fact that they provide a relatively inexpensive buoyancy material which is capable of withstanding relatively high hydrostatic pressures. Furthermore, unlike single-walled hollow pressure vessels which are subject to catastrophic failure when the wall is penetrated, the buoyancy materials with which the instant invention is concerned comprise a compartmentalized structure which tends to localize any failure due to implosion and thereby to retain most of its buoyancy.

Such materials are manufactured by packing hollow or foam filled, thin walled, generally spherical buoyant bodies ranging, in general, from one-sixteenth inch to about 6 inches in diameter, in a mold of a desired shape, and thereafter filling the interstices among the buoyant bodies with a syntactic foam. The syntactic foam serves as a matrix to encase the implodable buoyant bodies and reinforces the walls thereof. However, as will be apparent from the foregoing description of their method of manufacture, buoyant bodies located near surface areas of such materials remain unreinforced since only a thin syntactic foam layer or no syntactic foam layer is interposed between the walls of the buoyant bodies and the surface of the finally formed article. In this circumstance, the hydrostatic pressure to which the materials can be subjected is significantly diminished, since the buoyant bodies nearest the surface remain subject to implosion.

Additionally, such materials are vulnerable to impact damage during transit and handling prior to use which may produce surface areas particularly vulnerable to implosion. In this regard, it should be noted that such materials are frequently fashioned to form massive flotation devices which can weigh upwards of a ton. Obviously, such devices are subjected to extraordinarily harsh conditions. During transit and installation, there are numerous dangers of impact damage, and thereafter such devices are subjected to harsh, undersea high pressure environments.

It is well known that strength and impact resistance of buoyant materials of the type described may be improved by applying a protective skin, e.g., a fiberglass resin laminate. However, this type of skin, which must be excessively thick in order to provide suitable protection to the buoyant bodies, is characterized by a substantially increased weight.

In most prior art structures, the fiberglass laminate skin is applied to the otherwise completed buoyancy material. This necessitates suitable surface preparation, e.g. sand blasting or abrasive treatment, prior to application and significantly increases the cost of the final product. Alternatively, the fiberglass can be applied to the interior of the mold and impregnated during molding in a manner similar to the process used in forming the unique skin which is the subject of this invention. However, in this case, the thickness of the fiberglass laminate required is excessive if a performance equivalent to that of the present invention is desired. This excessive thickness is costly in terms of fiberglass and labor required. However, the excessive weight is its major disadvantage.

Additionally, it has been observed that an externally applied fiberglass laminate may not provide the kind of protection required. This is because, at high hydrostatic pressures, water inevitably penetrates the laminate and reaches the interface between the laminate the the buoyant core material. When the device is returned to the relatively low pressure surface environment, the depressurization induces delamination.

From the foregoing, it will be apparent that an ideal buoyant structure should be capable of withstanding the hydrostatic pressure characteristic of the ocean depth in which it is to be used without implosion, should be strong and resistant to damage caused by impact encountered during transit and handling, should not absorb significant quantities of water in use, should have a low density (thus a high buoyancy), and should be inexpensive to manufacture.

SUMMARY OF THE INVENTION

The present invention achieves such a structure by providing a layered integral skin for buoyancy materials of the type described. The skin comprises an inner layer of syntactic foam of a thickness sufficient to prevent implosion of buoyant bodies located in the outer portions of the buoyancy material when subjected to a desired hydrostatic pressure, and an outer layer of resin permeated reinforcing material to add strength and protect the buoyant core and the inner layer against impact damage. The outer layer of the skin also aids in preventing implosion of the buoyant bodies at desired hydrostatic pressure, but, due to the fact that it is much thinner than the inner layer of the skin, its effect in this regard is minor.

Accordingly, it is an object of this invention to provide a more durable and lower cost buoyant structure which is capable of withstanding greater hydrostatic pressure than heretofore possible.

Another object of the invention is to protect such buoyant structures from impact damage and add strength with a skin which only minimally increases the overall density of the material and thus does not seriously reduce its buoyancy.

Another object of the invention is to provide a layered protective skin which will resist delamination despite repeated alternating exposures to deep sea high pressure and atmospheric pressure.

Still another object of the invention is to provide such a buoyant structure which has a skin capable of absorbing substantial impact damage with only minor surface effect.

Another object of the invention is to protect implodable buoyant bodies located in the outer portions of the known buoyancy materials of the type described.

Yet another object of the invention is to provide such a skin which may be conveniently manufactured and which does not require preparation of the surface of the buoyant core it protects prior to its attachment thereto. This results in lower cost fabrication than heretofore possible.

An important feature of the invention resides in a protective skin for a buoyancy material, comprising an outer layer of reinforcing material permeable to syntactic foam and an inner layer of syntactic foam, both layers being integral with the matrix of the buoyant core.

Other objects and features of the invention will be apparent from the following description of the preferred embodiment and from the drawing.

DESCRIPTION OF THE PREFERRED EMBODIMENT

Figure 1:
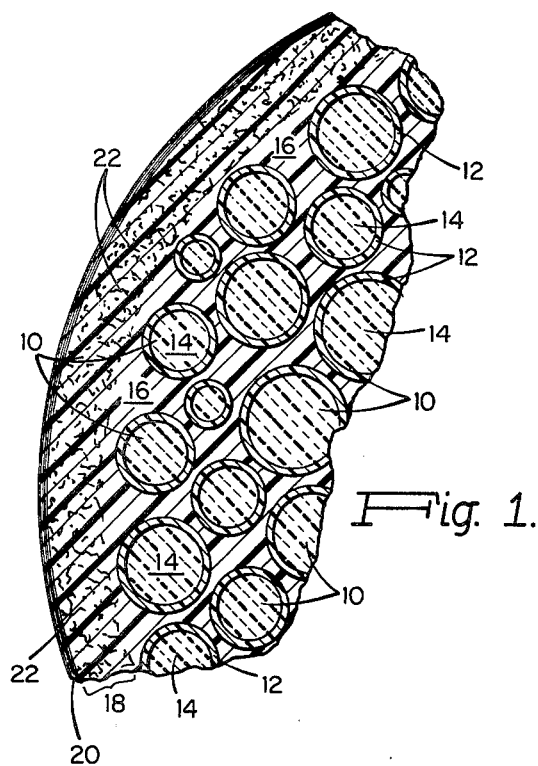
FIG. 1 is a schematic representation of a cross-section of a fragment of the improved buoyant structure of the invention.

At the outset, the invention is described in its broadest overall aspect with a more detailed description following.

The present invention provides a protective skin for a core of known buoyancy material of the type comprising a plurality of generally spherical buoyant bodies encased in a matrix of syntactic foam having a specific gravity less than 1.0. The skin comprises an inner layer of syntactic foam, integral with the matrix, which layer is characterized by a thickness and structural strength suitable for protecting buoyant bodies located in outer portions of the matrix from implosion at a desired hydrostatic pressure. An outer layer of reinforcing, resin-permeable material provides a strong and impact resistant outer skin which, in the finally formed article, is permeated with a resin integral with the resin component of the inner syntactic foam layer and with the matrix. A single resin is always used for the matrix and the layered skin.

The buoyant cores with which the skin of the instant invention is useful may be fabricated from a wide variety of different types of buoyant bodies and hardenable resins and are known in the art. The hardenable resin may comprise epoxy, polyester, urethane, phenolic, or the like, and will be mixed with a multiplicity of microspheres to reduce its density. Alternatively, a hot melt resin or wax could be used, the resin or wax being flowable when hot, but hard when cooled. The term "syntactic foam," as used herein, means a hardenable resin containing such microspheres. Suitable syntactic foams are well known in the art. See, for example, U.S. Pat. No. 3,230,184 to H. E. Alford.

Many different types of microspheres may be incorporated in a resinous material to form a suitable syntactic foam. Suitable microspheres are disclosed in U.S. Pat. No. 2,797,201 to F. Veatch et al. and U.S. Pat. No. 3,247,158 to H. E. Alford et al. and are commercially available from, for example, Emerson & Cuming, Inc., Canton, Massachusetts, under the trademark "Microballoons." Typically, these microspheres range from 5 to 500 microns in diameter and may be made of ceramic, glass, or film-forming polymeric materials.

The buoyant bodies encased in the matric are of a nature well known in the art. They may be of any convenient size and, often, several different sizes are used to achieve close packing. Suitable buoyant bodies may be fabricated from phenolic, polyester, epoxy, or thermoplastic resins. They may or may not be fiberglass reinforced. They may be either hollow or filled with low density foam. Such structures are available commercially from, for example, Emerson & Cuming, Inc. under the trademarks "Eccospheres EP", "Eccospheres HS", and "Eccospheres HB".

The inner layer of the skin of the invention comprises a syntactic foam which has sufficient structural strength and thickness to protect buoyant bodies on the outer portions of the matrix from implosion at a desired hydrostatic pressure. In this regard, the thickness of this inner layer will depend on the strength of the walls of the buoyant bodies, the structural strength of the particular syntactic foam chosen, the thickness and strength of the outer layer, and the hydrostatic pressure to which the final product will be subjected. For purposes of ease of manufacture, as will become apparent hereinafter, this layer may contain a spacer means imbedded in the resin which functions to retain the buoyant bodies inwardly from the surface of the finally formed article during its manufacture. The preferred spacer means comprises a composition of enmeshed filamentary material, e.g., fibers of plastic, such as is manufactured by American Enka Corp. And sold under the trademark "Enkamat". This composition, by virtue of its resistance to compression, establishes a desired inner layer thickness. Obviously, many other structures may be employed, e.g., performed or partially cured syntactic foam materials or honeycomb structures having their cell axes aligned radially with respect to the buoyant core.

The outer layer of the skin of the invention comprises a resin-impregnated fibrous reinforcing material which is selected for its strength and ability to provide a hard, preferably smooth, surface to the finally formed article. Fibrous glass mat is a preferred material for this purpose, although those skilled in the art will readily be able to substitute other materials such as woven fiberglass fabrics, fabrics or mats made from carbon, nylon, metal fibers, or synthetic materials such as those sold under the trademarks "Kelvar" and "Dacron" by E. I. DuPont de Nemours & Company, Incorporated. Whatever the nature of the permeable reinforcing material chosen, all embodiments of the skin of the instant invention are characterized by an outer layer comprising a reinforcing material permeated with a hardenable resin integral with the inner layer.

Referring to FIG. 1, a fragment of the improved buoyant structure of the invention is shown. It comprises a plurality of buoyant bodies 10 of various sizes, each of which comprises an outer wall 12 formed from fiberglass reinforced epoxy resin and an inner core 14 of low density polystyrene foam. The polystyrene foam has a density less than 0.039 grams/cc. It is present in certain buoyant bodies since the manufacturing process requires a core onto which the fiberglass and epoxy may be applied. The buoyant bodies range in density from about 0.15 to 0.45 grams/cc. A matrix of syntactic foam 16, comprising hardened epoxy resin which contains hollow boro-silicate glass microspheres, encases buoyant bodies 10 and forms a layered skin comprising inner layer 18 and outer layer 20. The inner layer 18, usually less than about 1 inch thick, contains spacer means 22 comprising an open weave nylon mat-like structure, i.e., Enkamat. The outer layer 20 comprises a roughly one-sixteenth to one-fourteenth inch thick mat of fiberglass, permeated with syntactic foam 16. Syntactic foams are required for use with the invention because of their low density and ability to absorb impact by breakage of the microspheres. This latter propery has particular utility with respect to inner layer 18. Advantageously, the outer layer 20 will contain a reduced concentration of hollow microspheres when fiberglass mat or other close weave structure is used since the microspheres tend to be "filtered out" during molding. Thus, the outer layer may, in some embodiments, consist only of the reinforcing material, the resin used in the syntactic foam, and a reduced concentration of microspheres relative to interior portions of the structure. This is desirable since a harder, less water-absorbent outer skin is provided.

Figure 2:
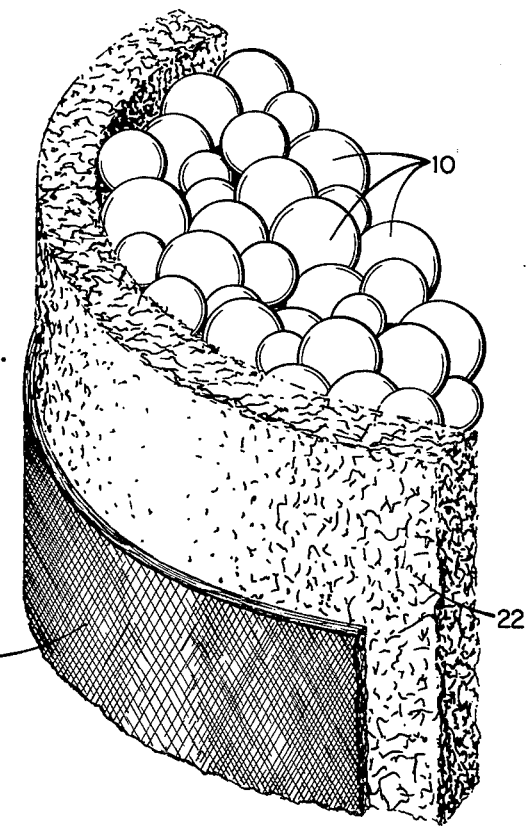
FIG. 2 is a partly cut away view of the materials which comprise the outer portion of the improved buoyant structure of the invention.

The method of manufacture of the buoyant structure of FIG. 1 is as follows. A two part mold of a desired shape is first coated with a release agent and thereafter lined with the fiberglass mat 24 (see FIG. 2). Next, the spacer means 22 is placed adjacent the fiberglass mat 24. Ordinarily, mat 24 and spacer means 22 will be adhered together and to the interior of the mold by weak adhesive bonds which are sufficient to maintain the position of the materials but which will not seriously interfere with demolding of the finished product nor degrade its structural properties. Thereafter, the mold parts are clamped together and the interior cavity formed is packed with a multiplicity of buoyant bodies 10. The thickness of the fiberglass mat 24 defines the thickness of the outer layer 20 of the final product; the thickness of the spacer means 22 likewise defines the thickness of the inner layer 18. Syntactic foam, preferably pre-evacuated, is next introduced into the mold cavity to permeate glass mat 24 and spacer means 22, thereby forming the layered skin, and to fill the interstices among the buoyant bodies, the syntactic foam thus forming a continuous structure throughout all elements of the final product.

Those skilled in the art will readily be able to utilize various techniques for introducing the syntactic foam such that air pockets and other defects are avoided. A preferred method is to employ a process wherein a vacuum is maintained within the mold and resin is forced into the mold cavity by atmospheric pressure or higher than atmospheric pressure. After hardening, the mold parts are removed, and the exterior surface of the outer layer 20 may be cleaned and painted if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A protective skin for a buoyancy material of the type which comprises a plurality of discreet, implodable buoyant bodies in a matrix of syntactic foam having a specific gravity less than 1.0, said skin comprising an outer layer of permeable reinforcing material, a permeable spacer means interposed between said permeable material and said buoyancy material, and a syntactic foam integral with said matrix, dispersed within said permeable reinforcing material and said spacer means for defining a pressure resistant layer about said buoyancy material.

2. The protective skin of claim 1 wherein said syntactic foam comprises a hardenable epoxy resin containing hollow glass microspheres.

3. The protective skin of claim 1 wherein said syntactic foam comprises a hardenable resin selected from the group consisting of polyester, urethane, phenolic resins, and mixtures thereof.

4. The protective skin of claim 1 wherein said spacer means comprises an open structured filamentary material.

5. The protective skin of claim 1 wherein said permeable reinforcing material comprises fiberglass.

6. The protective skin of claim 1 wherein said permeable outer layer of reinforcing material comprises a layer less than 0.25 inch thick and said pressure resistant layer is less than 1 inch thick.

7. The protective skin of claim 1 wherein the syntactic foam dispersed within said permeable reinforcing material contains a reduced concentration of microspheres relative to interior portions of said skin.

8. The protective skin of claim 1 wherein said buoyant bodies comprise foam-filled, generally spherical structures having walls made from a substance selected from the group consisting of epoxy, phenolic, polyester, urethane, thermoplastic materials, and compatible mixtures thereof.

9. The protective skin of claim 1 wherein said buoyant bodies are hollow.

10. A buoyant structure comprising a plurality of implodable buoyant bodies encased in a matrix of syntactic foam having a specific gravity less than 1.0, said foam comprising a hardenable resin and a multiplicity of hollow microspheres, wherein the improvement comprises a layered skin comprising, in combination
   an inner layer of said syntactic foam having a thickness capable of preventing implosion of buoyant bodies in the outer portions of said matrix at a desired hydrostatic pressure, and
   an outer layer of permeable reinforcing material permeated with a member selected from the group consisting of said syntactic foam, the hardenable resin component of said snytactic foam, and mixtures thereof for protecting said inner layer and said buoyant bodies from impact damage, the hardenable resin in said layers being intergral with said matrix.

11. The improved buoyant structure of claim 10 wherein said syntactic foam comprises a hardenable epoxy resin containing hollow glass microspheres.

12. The improved buoyant structure of claim 10 wherein said syntactic foam comprises a hardenable resin selected from the group consisting of polyester, urethane, phenolic resins, and mixtures thereof.

13. The improved buoyant structure of claim 10 wherein an open structured filamentary material is embedded in said inner layer.

14. The improved buoyant structure of claim 10 wherein said permeable reinforcing material comprises fiberglass.

15. The improved buoyant structure of claim 10 wherein said buoyant bodies comprise foam filled, generally spherical structures having walls made from a member selected from the group consisting of epoxy, phenolic, polyester, urethane resins, thermoplastic materials, and compatible mixtures thereof.

16. The improved buoyant structure of claim 10 wherein said buoyant bodies are hollow.

17. A buoyant structure comprising a plurality of implodable buoyant bodies encased in a matrix of syntactic foam having a specific gravity less than 1.0, said foam comprising a hardenable resin and a multiplicity of hollow microspheres, wherein the improvement comprises a layered protective skin comprising, in combination, an inner layer of said syntactic foam of a thickness capable of preventing implosion of buoyant bodies in the outer portions of said matrix at a desired hydrostatic pressure, and an outer layer of fiberglass, permeated, for protecting said inner layer and said buoyant bodies from impact damage, with a member selected from the group consisting of syntactic foam, the hardenable resin of said syntactic foam, and syntactic foam containing a reduced concentration of hollow microspheres relative to the concentration of said microspheres in said matrix, the hardenable resin in said layers being integral with said matrix.

* * * * *